Patented Oct. 8, 1946

2,408,920

UNITED STATES PATENT OFFICE 2,408,920

PROCESS FOR SEPARATING MERCAPTANS

Harry E. Drennan, Bartlesville, Okla., assignor to Phillips Petroleum Company, a corporation of Delaware No Drawing. Application September 1, 1944, Serial No. 552,376

8 Claims. (Cl. 260—609)

This invention relates to the treatment of mixtures of mercaptans. An important embodiment of the invention relates to the separation of alkyl mercaptans into groups according to molecular weight range. In one specific aspect this invention makes possible the treatment of mercaptan-hydrocarbon mixtures whereby mercaptans having from 1 to about 8 to 10 or 11 carbon atoms per molecule are selectively removed as a group from hydrocarbon solutions also containing substantial quantities of tertiary mercaptans of higher molecular weight. By means of certain modifications of the invention I may separate one or more alkyl mercaptans having molecular weights below about 175 from one or more tertiary alkyl mercaptans having molecular weights above about 200, by preparation of a solution of said mercaptans of controlled concentration in a liquid hydrocarbon or other substantially inert substantially water-insoluble organic liquid, and treatment of the thus-prepared solution with a strong aqueous alkali metal hydroxide solution.

The removal of low molecular weight mercaptans from petroleum distillates by means of extraction with aqueous caustic soda solutions is well known. It is also recognized that caustic treatment of petroleum distillates is effective in removing only the low-boiling alkyl mercaptans such as methyl and ethyl mercaptans. Since the ease of removal of mercaptans from a hydrocarbon oil phase by extraction with aqueous alkali decreases markedly with the increase in molecular weight of the mercaptans, it has been proposed to employ repeated extractions with relatively dilute caustic solutions to effect fractional separation of low molecular weight homologous mercaptans. In the extensive art of caustic treatment of petroleum distillates, there is definite indication that maximum extractive efficiency is realized at sodium hydroxide concentrations of from 8 to 10 per cent, while at higher concentrations the extraction has been reported as exhibiting decreased efficiency. As a result of the limitations imposed on the removal of mercaptans with aqueous caustic solutions, the development of various "solutizer" processes has been stimulated, in which an added material, such as an alcohol, is used to enhance solubility of mercaptans in aqueous alkaline solutions. However, such extraction processes have invariably been directed toward the complete and non-selective removal of mercaptans from gasoline distillates having mercaptan sulfur contents usually less than about 0.1 weight per cent, and hardly ever over 1 per cent. On the other hand, it has been stated that by using saturated solutions of alkali metal hydroxides, one may effect complete precipitation of alkali metal mercaptides, even those of mercaptans of high molecular weight. Here, too, the application was to the usual quite dilute solutions of mercaptans in hydrocarbon distillates wherein the mercaptan content was not above about 0.1%.

Recently, the utilization of mercaptans, especially the higher alkyl homologs, as modifiers in the manufacture of synthetic rubber has created a demand for relatively large quantities of special mercaptan fractions substantially free from non-mercaptan impurities. Such mercaptans are often best prepared by the catalytic addition of hydrogen sulfide to selected olefins, such as triisobutylene or other olefin polymers, for example as described in the copending applications of Walter A. Schulze, Serial No. 493,463, and of Walter A. Schulze and Willie W. Crouch, Serial Nos. 506,902, 506,903 and 506,904. The crude mercaptan oil from such a reaction of hydrogen sulfide with a $C_{12}$ olefin such as triisobutylene comprises, in the main, mixtures of butyl, octyl, dodecyl, and sometimes higher, tertiary mercaptans, usually along with unreacted olefin. The relative proportions of the various components is of course dependent on the nature of the catalyst, operating conditions, and the composition of the olefin charge. Because of the exceptional modifying action of tertiary mercaptans having about 12 carbon atoms per molecule in emulsion polymerizations of the type which produces Buna-type synthetic rubbers, it is often necessary that the lower boiling mercaptans be separated from these more valuable heavier mercaptans in the crude reaction mixture.

It is an important object of this invention to effect the separation, from mercaptan mixtures, of mercaptans of different molecular weights one from the other.

Another object is to effect the treatment of a crude mercaptan oil containing a plurality of alkyl mercaptans to effect substantially complete removal therefrom of alkyl mercaptans having molecular weights below about 175.

A further object of my invention is to treat an alkyl mercaptan mixture in a liquid hydrocarbon medium with concentrated aqueous alkali metal hydroxide solutions under conditions selected so that mercaptans in the molecular weight range below about 175 are converted to solid or semisolid alkali metal mercaptides which are insoluble in the hydrocarbon and the aqueous solution, and hence may be segregated by filtration, centrifuging, or other physical means.

A further object is to provide a process by means of which alkyl mercaptans of less than about 8 to 10 carbon atoms per molecule are removed from admixtures containing higher tertiary mercaptans and hydrocarbon oil, and subsequently recovering substantially hydrocarbon-free mercaptans both from the separated alkali metal mercaptides and from the hydrocarbon phase.

Further objects and advantages of the invention will be apparent to one skilled in the art, from the accompanying disclosure and discussion.

My new mercaptan separation process is based on my discovery that selective mercaptide precipitation can be realized by treatment, with concentrated aqueous solutions of alkali metal hydroxides, of hydrocarbon solutions of mercaptans in which the mercaptan sulfur content of the said hydrocarbon solution is carefully adjusted. I have found that $C_{12}$ tertiary mercaptan-hydrocarbon solutions having a mercaptan sulfur content not above about 3.5 per cent by weight will not give any precipitate of $C_{12}$ mercaptides upon contact with strong aqueous alkali solutions. On the other hand, I have discovered that lighter mercaptans having carbon chains of not more than about 8 to 10 carbon atoms per molecule will readily react with strong caustic solutions to yield solid and mechanically separable mercaptides from hydrocarbon solutions containing as little as about 0.2 to 0.3 per cent mercaptan sulfur or even less. In a preferred modification of the invention, a separation of $C_8$ and lighter mercaptans from $C_{12}$ and heavier tertiary mercaptans is effected from mixtures of such mercaptans by the addition of a suitable liquid hydrocarbon until the heavier component group accounts for not more than about 3.5 weight per cent of the mercaptan sulfur content of the resultant solution, and then contacting said solution, preferably at substantially atmospheric temperatures, with a concentrated aqueous alkali metal hydroxide solution to precipitate most or all of the lighter mercaptan group of components as alkali metal mercaptides without the inclusion of appreciable quantities of the heavier mercaptan components in the precipitate.

One specific and preferred embodiment of my invention involves the application of the above-described principles to the treatment of a crude mercaptan oil product derived from the catalytic addition of hydrogen sulfide to a mixture of isomeric $C_{12}$ olefins, that is olefins having twelve carbon atoms per molecule, preferably largely tertiary olefins. The said crude reaction product is comprised of unreacted olefins, and of $C_{12}$, $C_8$, and $C_4$ mercaptans, which boil, respectively, at about 450, 300, and 145° F. at atmospheric pressure. Ordinarily the crude reaction product will contain from about 4 to about 7 weight per cent $C_{12}$ mercaptan sulfur, 1 to 3 per cent $C_8$ mercaptan sulfur and lesser amounts of $C_4$ mercaptan sulfur. While the relative amounts of the three mercaptan component groups may be accurately determined by analysis, it is usually sufficient for the purposes of this invention to determine only the $C_{12}$ mercaptan sulfur content. A substantially sulfur-free liquid hydrocarbon diluent is then added in sufficient quantity to reduce the tertiary $C_{12}$ mercaptan sulfur content to about 3.5 per cent or somewhat lower, while still leaving the $C_8$ and $C_4$ mercaptan sulfur contents at values sufficiently high to permit their subsequent precipitation. The adjusted solution is then agitated with a stoichiometric excess of a substantially saturated aqueous solution of sodium hydroxide in order to precipitate the $C_8$ and lighter mercaptans as sodium mercaptides. If desired, the precipitation may be carried out in two or more stages, but this has little advantage over a single-stage contacting. The precipitate is separated by means of a filter or a centrifuge, and the oil and aqueous phases of the filtrate are also separated. The oil phase containing the $C_{12}$ mercaptans, now substantially free of lower boiling mercaptans, is processed by solvent extraction, by distillation, or by any other suitable means to recover the desired heavy mercaptans. In order to recover the light mercaptans, the mercaptide precipitate is preferably washed with a light hydrocarbon solvent to extract neutral oil and adsorbed $C_{12}$ mercaptans as described and claimed in my copending application Serial No. 552,375, filed of even date herewith. The light mercaptans are then liberated from the sodium salts by hydrolysis, as by reaction with dilute acid, by steaming, by simple hydrolysis with water, or by other suitable means, and may be recycled to the mercaptan-synthesizing process to inhibit their further formation, or may be used for any suitable purpose.

While the hydrocarbon-containing effluent from the synthesis of mercaptans by addition of hydrogen sulfide to olefin polymers is particularly suited to treatment by my process, mixtures of mercaptans from other sources can be efficiently processed by controlling the mercaptan sulfur concentrations as previously set forth. In addition to alkyl mercaptans, many alkenyl mercaptans, that is those having an olefinic linkage, mercaptans having various substituents such as halogen, hydroxy, or other groups inert under the conditions of treatment, and other organic mercaptan compounds, are also subject to treatment in accordance with the principles of this invention.

Hydrocarbon diluents for use in adjustment of sulfur concentration may comprise paraffins, olefins, aromatic, and/or cycloaliphatic hydrocarbons. Surprisingly enough, I have found that the molecular weight of the hydrocarbon diluent, within reasonable limits, has very little effect on the value to which the $C_{12}$ mercaptan sulfur content of the hydrocarbon-diluted mercaptan material must be reduced. Thus propane, butane or other low-boiling hydrocarbons, or much heavier hydrocarbons, such as a 300–400° F. heavy gasoline cut, may be used. Other diluents which are suitable in some instances are chlorinated hydrocarbons, certain amines, and other organic liquids which are substantially inert under the conditions of use; however, these diluents are not necessarily the equivalents of the preferred hydrocarbon diluents, and the numerical values cited herein for mercaptan sulfur contents when using hydrocarbons may be somewhat different when using non-hydrocarbon diluents.

The mercaptide precipitation is preferably effected at substantially atmospheric temperatures, that is between the solidifying point of the aqueous alkaline solution on the low-temperature side to about 125° F. on the high-temperature side. The limiting value for $C_{12}$ mercaptan sulfur content of 3.5% may vary slightly, say from 0.1 to 0.3%, within this temperature range, being lower at low temperatures and higher at high temperatures.

For the formation of the solid alkali metal mercaptides, aqueous alkali metal hydroxide solutions substantially saturated at operating temperatures are preferred. In order to obtain the most effective results, in the use of sodium hydroxide the aqueous sodium hydroxide solution should contain at least about 40 per cent by weight of the sodium hydroxide, while optimum concentrations are those in the range of 50 to 60 per cent. The hydroxides of any of the alkali metals, that is the hydroxides of lithium, sodium, potassium, rubidium, and cesium, may be used, but sodium and potassium hydroxides are generally the cheapest and most readily available, and in some ways the most satisfactory. An excess of undissolved metal hydroxide may advantageously be suspended or otherwise present in the saturated solution. The sodium and potassium mercaptide of $C_{12}$ tertiary mercaptans are both soluble in hydrocarbons at substantially atmospheric temperatures, to the extent of about 3.5 weight per cent. The solubilities of the mercaptides of other alkali metals are of the same order of magnitude, although the actual values vary to a limited extent for the different metals.

The following operations are herewith presented in further illustration of the operation of my invention. Inasmuch as these data are merely exemplary, it will be appreciated that they are not to be construed as unduly limiting the scope of the invention.

Example I

A synthetic blend of 57 g. of $C_{12}$ mercaptans and 18 g. of $C_8$ mercaptans was subjected to treatment for the segregation of the two component groups of mercaptans. In order to prepare a hydrocarbon solution containing 3.5 weight per cent of $C_{12}$ mercaptan sulfur, 125 g. of triisobutylene was added to the mercaptan mixture. The resultant hydrocarbon blend was agitated at room temperature with 20 ml. of a 52 per cent aqueous sodium hydroxide solution to form a solid precipitate. After vacuum filtration the precipitate was washed with two 100 ml. portions of n-pentane. The precipitate was then dried by passing nitrogen through the mercaptides at 106° F. for 30 minutes. Analysis of the filtrate showed a total mercaptan sulfur content of 3.8 per cent, as compared with 5.5 per cent in the untreated hydrocarbon blend. Further treatment of the filtrate with caustic solution failed to produce any further precipitation. The precipitate comprised essentially $C_8$ sodium mercaptides.

Example II

A crude mercaptan oil (200 ml.) containing 5 weight per cent $C_{12}$ mercaptan sulfur and 2 weight per cent of $C_8$ and lighter mercaptan sulfur, was diluted with 88 ml. of triisobutylene to reduce the $C_{12}$ mercaptan sulfur content to 3.5 per cent. The $C_8$ mercaptan sulfur content was then 1.6 per cent. The thus-diluted mercaptan solution was treated at room temperature with 20 ml. of 55 per cent aqueous potassium hydroxide solution. The resultant potassium mercaptides were filtered and washed with two 100 ml. portions of n-pentane. The oil-free mercaptide precipitate was then hydrolyzed with water to yield 14 ml. of an oily phase containing 22 weight per cent mercaptan sulfur, which corresponds closely to the sulfur content of octyl mercaptans. The mercaptan-containing filtrate was found on analysis to contain 3.85 per cent mercaptan sulfur. Further treatment of the filtrate with strong potassium hydroxide solution under the same conditions did not result in additional precipitate, thus indicating the presence of only small quantities, if any, of $C_8$ mercaptan.

While I have described my invention in detail with the inclusion of certain specific embodiments, no undue limitations as to the scope of the invention are thereby intended, except as imposed by the claims.

I claim:

1. In the preparation of tertiary alkyl mercaptans having twelve carbon atoms per molecule by the catalytic addition of hydrogen sulfide to tertiary olefin polymers having twelve carbon atoms per molecule wherein a crude reaction product is formed comprising essentially tertiary mercaptans having twelve carbon atoms per molecule, mercaptans having eight carbon atoms per molecule, mercaptans having four carbon atoms per molecule, and unreacted olefin polymers, said mercaptans having twelve carbon atoms per molecule being present in said crude reaction product to the extent that said product contains more than about 3.5 weight per cent sulfur with respect to the sulfur of said mercaptans having twelve carbon atoms per molecule, the method of separating said mercaptans having eight and less carbon atoms per molecule from said mercaptans having twelve carbon atoms per molecule which comprises adding to said crude reaction product sufficient liquid hydrocarbon diluent to reduce the sulfur content thereof with respect to the sulfur of said mercaptans having twelve carbon atoms per molecule to not more than about 3.5 weight per cent of the diluted reaction product, intimately contacting the thus-diluted reaction product with a strong aqueous solution of an alkali metal hydroxide at substantially atmospheric temperatures to precipitate said mercaptans having eight and less carbon atoms per molecule as insoluble alkali metal mercaptides, said mercaptans having twelve carbon atoms per molecule remaining unprecipitated.

2. The process of claim 1 further characterized by the additional steps of separating said precipitated mercaptides from the liquids, and hydrolyzing same to recover therefrom mercaptans having eight and less carbon atoms per molecule.

3. The process of claim 1 further characterized by the additional steps of separating said precipitated mercaptides and said aqueous solution from the remaining diluted crude reaction product, and recovering said mercaptans having twelve carbon atoms per molecule from said remaining crude reaction product.

4. The process of claim 1 in which said alkali metal hydroxide is sodium hydroxide.

5. The process of claim 1 in which said alkali metal hydroxide is potassium hydroxide.

6. A process for the separation of tertiary alkyl mercaptans having at least twelve carbon atoms per molecule from admixture with alkyl mercaptans having less than twelve carbon atoms per molecule which comprises adding to said admixture sufficient sulfur-free hydrocarbon oil to produce a hydrocarbon solution having not more than about 3.5 weight per cent mercaptan sulfur content with respect to the sulfur of said mercaptans having at least twelve carbon atoms per molecule, intimately contacting said solution with a substantially saturated aqueous solution of an alkali metal hydroxide to precipitate hydrocarbon-insoluble alkali metal mercaptides having less than twelve carbon atoms per molecule, and recovering from the remaining hydrocarbon solution said mercaptans having at least twelve carbon atoms per molecule.

7. The process of claim 6 in which said alkali metal hydroxide is sodium hydroxide.

8. The process of claim 6 in which said alkali metal hydroxide is potassium hydroxide.

HARRY E. DRENNAN.